Figure 1:
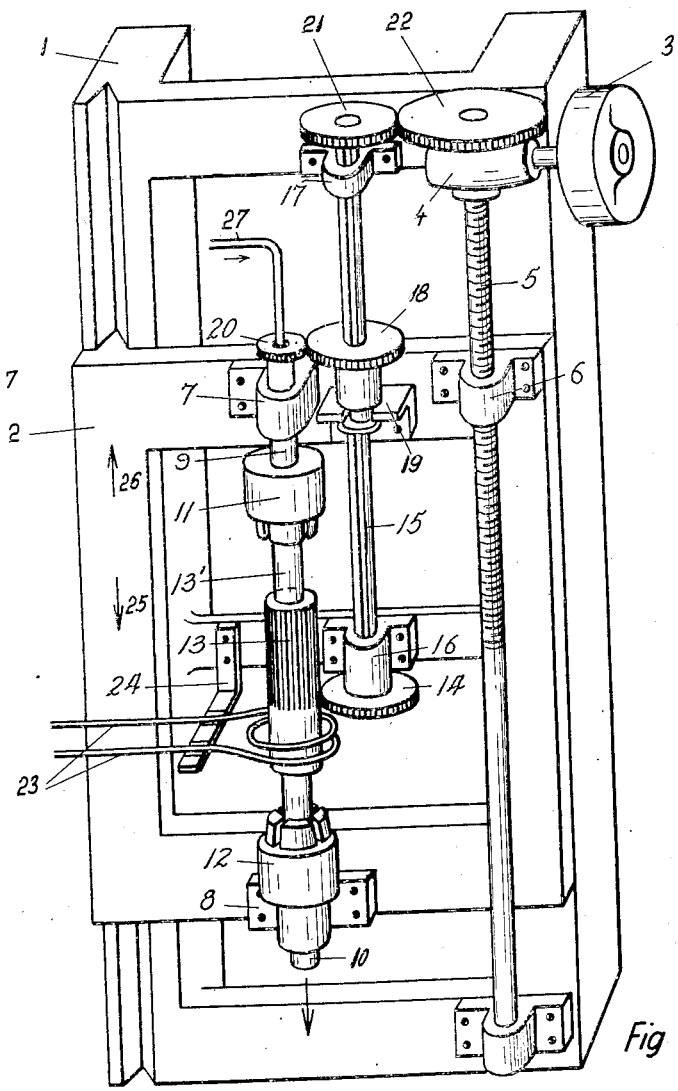

March 15, 1949. J. STIVIN 2,464,658
FASHIONING OF ARTICLES
Filed Jan. 23, 1947 3 Sheets-Sheet 1

Inventor
J. Stivin
By Glascock Downing Seebold
Attys

March 15, 1949. J. STIVIN 2,464,658
FASHIONING OF ARTICLES
Filed Jan. 23, 1947
3 Sheets-Sheet 2

Inventor
J. Stivin

March 15, 1949. J. STIVIN 2,464,658
FASHIONING OF ARTICLES
Filed Jan. 23, 1947 3 Sheets-Sheet 3

Inventor
J. Stivin

Patented Mar. 15, 1949

2,464,658

UNITED STATES PATENT OFFICE 2,464,658

FASHIONING OF ARTICLES

Jiří Stivín, Celakovice, near Prague, Czechoslovakia

Application January 23, 1947, Serial No. 723,793 In Germany September 4, 1942

Section 1, Public Law 690, August 8, 1946. Patent expires September 4, 1962

12 Claims. (Cl. 219—3)

In the known methods of operating on articles by the removal of shavings or grindins the structural conditions of the material are detrimentally affected through the material fibres in the article to be fashioned being cut through and the strength of the latter being thereby greatly reduced. On the other hand, methods are known, it is true, by means of which the article is deformed at the surface in the cold state without removing any material, for instance by impressing grooves or threads or by cold drawing or stamping and the like, but these methods of treatment are suitable only for shallow changes of shape and therefore do not come into consideration at all, where deeply extending deformations are required.

The heat treatment methods which might also be employed for the deformation of articles have the disadvantage, that the blank must be brought to red heat through the whole of its mass, so as to enable it to be easily deformed, but is then incapable of being held firmly in a reliable manner. But, heating the whole blank right through involves a great loss of time, is more or less uneconomical and is the cause of loss in weight by burning and the troublesome formation of scale, just at the surface which is to be operated on. Moreover, when operating on the heated blanks to be passed through draw-plates and the like, for instance in the production of section products, the extent of the deformation or the amount of tractive force that can be employed is greatly limited by the reduced strength of the thoroughly heated blank.

Now, a way was found, to arrive at a far more simple and, at the same time, more accurate and economical deformation. The new method of fashioning articles consists in this, that in the article to be changed in shape a temperature difference is produced by rapid surface heating between the surface layer and the interior of the article, whereupon the surface layer, thus softened, is subjected to further treatment in any suitable manner for the purpose of obtaining the desired deformation. This can be effected, for instance by rolling suitable tools over the blank for impressing the desired profiles or by operating on it by means of a calibrating gauge or the like.

In the method according to the invention the article is heated by an accurately regulated supply of heat at its surface to the desired depth so rapidly that only the layers which are just to be treated become soft, whilst the interior remains hard and firm and thus enables the blank to be securely clamped. Suitable sources of heat are, for instance, autogenous burners, induced high frequency current, strong electric current in the transition resistance, the electric arc, the salt bath and the like. The soft surface layer parts are then fashioned to the desired shape by pressing in suitable tools or by forcing them through the same. According to requirement the tools are internally cooled by a flow of cooling medium for the purpose of maintaining the requisite temperature difference.

The arrangement for carrying out the said method may be combined in such a manner with a device for hardening the article by chilling that the product is heated up, pressed, reheated and hardened in successive operations, without having to be released and reclamped. The article to be treated may be effectively protected from oxidation by placing the whole arrangement in a closed housing filled with a neutral atmosphere. Some constructional examples of the arrangement according to the invention are illustrated in the accompanying drawing.

Figures 2, 4:
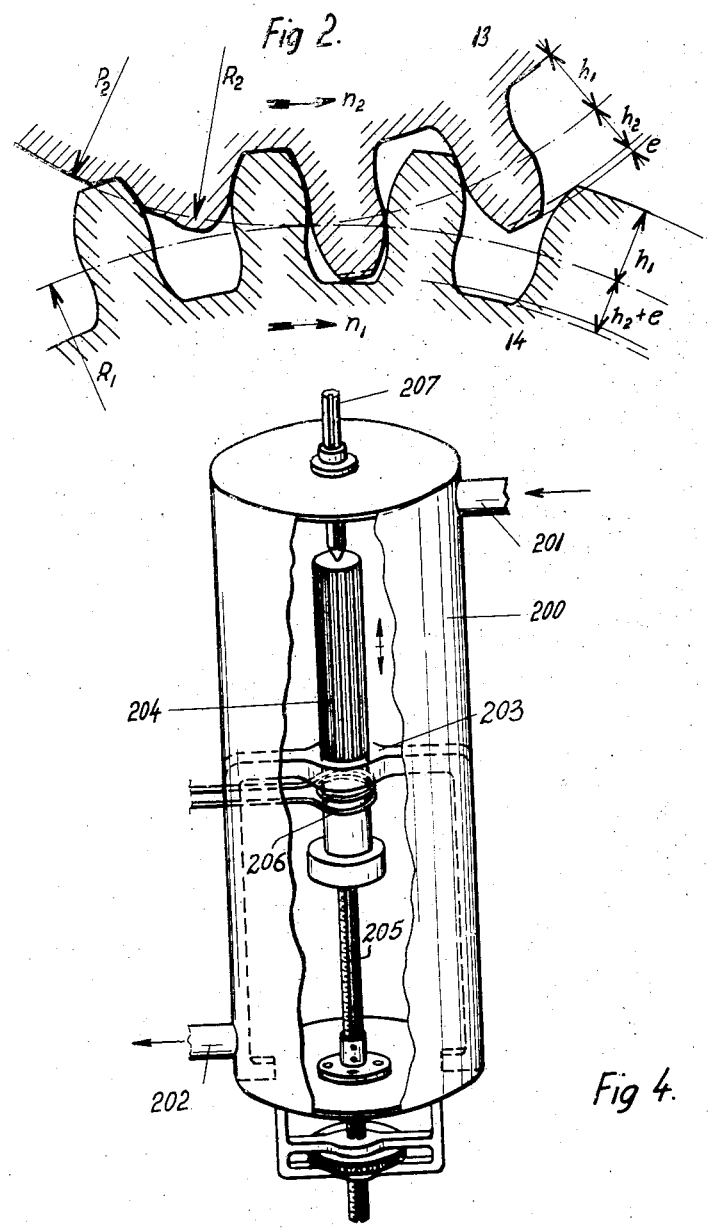
Figure 3:
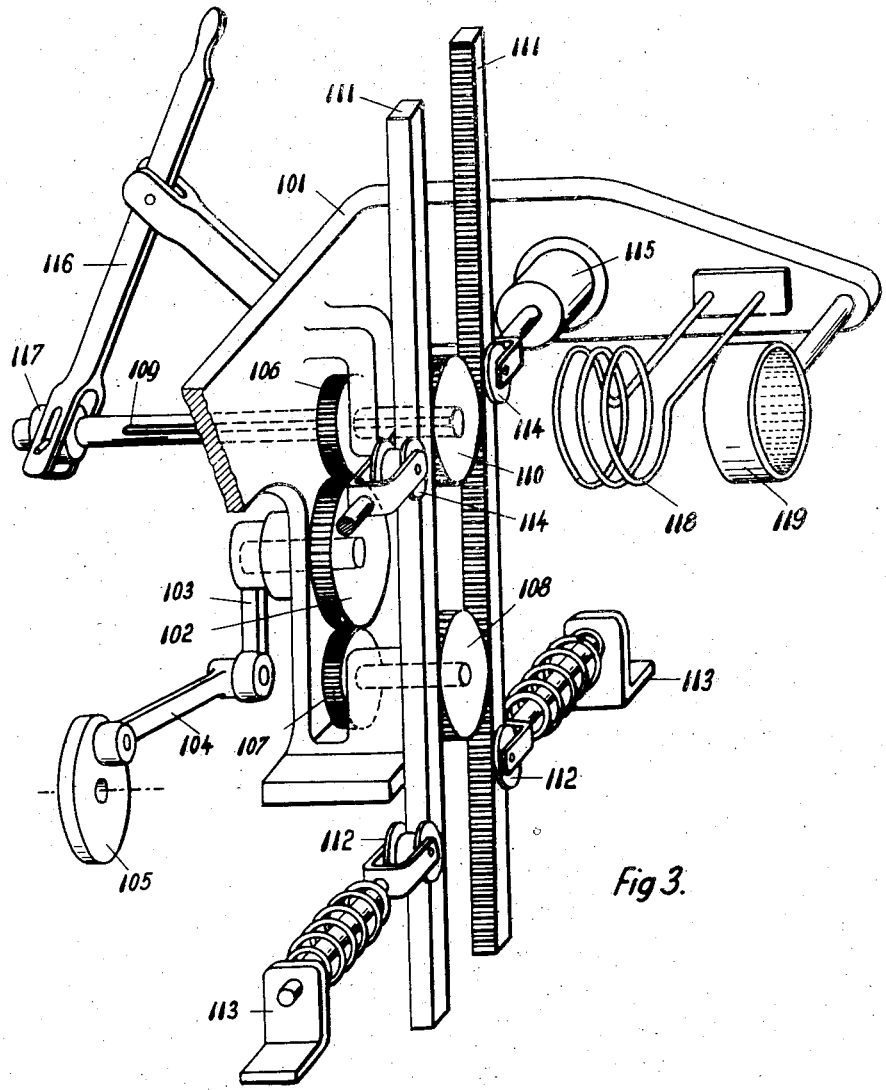

Figure 1 shows in perspective, diagrammatic view the arrangement for deforming superficially heated articles. Figure 2 shows diagrammatically the arrangement for pressing spur gearing teeth into cylindrical blanks. Figure 3 represents a perspective view of an arrangement for rolling and hardening spur wheels. Figure 4 shows the main features of a device for drawing suitable profiles in a closed space with neutral atmosphere.

The arrangement shown in Figure 1 consists of a frame 1, on the guide-cheeks of which a slide 2 has motion imparted to it by means of a belt pulley 3 by way of worm bearing 4 and a screw spindle 5 with a nut 6. The slide 2 supports oppsitely disposed, suitably fixed bearings 7, 8 for the shafts 9, 10, at the ends of which are clamping devices 11, 12 for the article 13, for instance with reduced ends, which is to be operated on. On the periphery of the article with the aid of a tool 14, for instance in the form of a toothed wheel, there is produced, for example by rolling, the desired profile, for instance gearing teeth or a polygonal cross-sectional form, grooving or the like. The profile of the tool 14 is formed on the principles of the rolling method and suitably corrected for the purposes of production.

The tool 14 is keyed on to a shaft 15 supported in the bearings 16, 17 of the frame 1, on which shaft the driving wheel 18 is slidable with key and groove or a hexagonal cross-section. The wheel is provided for this purpose on its hub with a driving groove for the driver 19 which is fixed to the slide 2, so that the wheel 18 is constrained to participate in the motion of the slide.

The wheel 18 is in mesh with a toothed wheel 20 fixed on the shaft 9. At the end of the shaft 15 is mounted a change-wheel 21 which is in mesh with a change-wheel 22 keyed on the worm-wheel shaft of the gearing 4. The article 13 to be operated on, for instance a shaft, is embraced by a heating device 23 supported on a bracket 24 on the frame 1. At the start of the operation the slide 2 is lowered in the direction of the arrow 25, until the off-set front part of the article 13 passes into the heating device 23, for instance into a heating coil fed by a high frequency generator. In this position the tool 14 is opposite the off-set portion of the shaft 13, so that it is free. Current is applied to the heating device and at the same time the belt pulley 3 is started up, causing the slide 2 to be put in motion in the direction of the arrow 26 by means of the worm gearing 4 and the nut 6. At the same time the shaft 15 which is connected by the change-wheels 21 and 22 with the worm gearing 4 is put in rotation, causing the tool 14 fixed on the shaft 15 and the driving wheel 18 to rotate as well. In this way the rotary motion is also transmitted through the toothed wheel 20 and the shaft 9 to the article 13. The slide 2 is displaced in the direction of the arrow 26 and the teeth of the tool 14 commence to engage in the heated surface of the article 13. Owing to the speeds of revolution of the tool 14 and of the article 13 being determined by the transmission ratio of the gear-wheels 18, 20, by rolling off the teeth of the tool 14 the desired profile is impressed into the superficially heated and thereby softened layer of the article 13. By means of an obliquely placed pinion it is also possible, for instance, to produce threads. If required, the article under treatment can also be suitably cooled by injecting a cooling medium into its bore, for which purpose the cooling medium is forced out of a tube 27 having perforations around its periphery and extending as far as the heating place.

Figure 2 shows diagrammatically the manner, in which teeth are formed by the rolling method. The tool 14 has the form of a toothed wheel with teeth to the number of $Z_1$ and rotates in the direction of the arrow at the speed of revolution $n_1$ per minute. The pitch circle has a radius $R_1$. The tool 13 is a cylinder with the radius $P_2$ and rotates in the direction of the arrow at a speed of revolution $N_2$ per minute. During operation the teeth of the tool 14 are forced into the periphery of the article under treatment, which has been softened by heat, and on it is formed toothing with $Z_2$ teeth, with $$Z_2 = \frac{Z_1 \cdot N_1}{N_2}$$

The pitch circle radius $$R_2 = \frac{R_1 \cdot N_1}{N_2}$$

Let the height of the tooth head be $h$. In order correctly to form the crown of the tooth head, the tool teeth are so formed that the height of the tooth head of the tool is greater than $h$ by an amount $e$. This makes it possible, should the initial radius $P_2$ of the article be slightly inaccurate, for any excess of material to be forced into the tooth crowns. By this means there is formed at the tooth head of the toothed wheel which is to be fashioned a "false head" of a height $e$, which is removed by being turned or ground off. The necessary space for the addition is ensured by the height of the tooth base of the tool being made $h-e$.

Let the height of the tooth base of the article to be fashioned be $h_1$ and the height of the tooth head of the tool also $h_1$. For enabling the tool to be trimmed by grinding, when it has become worn, it is made initially with a so-called corrected toothing, that is to say, the head circle radius is made greater by an amount $f$ than the theoretical value $(R_1 - h_1)$.

Figure 3 shows an arrangement of the machine for surface fashioning and hardening by superficial heating as applied to gear wheels, sprocket wheels or the like. In the frame 101 there is mounted on a short shaft a toothed wheel 102 which by means of a crank 103 and a connecting rod 104 has an alternating rotary motion imparted to it, when the crank disc 105 which by its eccentric crank pin drives the said connecting rod has a rotary motion imparted to it. The spur wheel 102 is in mesh with the two spur wheels 106 and 107. The wheel 107 is keyed on a short shaft, on the other end of which is mounted an exchangeable spur wheel 108. The wheel 106 is supported on a grooved, axially slidable shaft 109 which is journalled in the frame 101 and to the end of which is keyed the article 110 which is to be fashioned. The spur wheel 108 meshes with two racks 111 which by means of spring-loaded rollers 112 guided in brackets 113 are pressed against the wheel 108. At the level of the article 110 the racks 111 are acted on by further pressure rollers 114 of a pressure-actuated pressure applying device 115. The axial displacement of the shaft 109 is effected by means of a lever 116 which is supported in the frame 101 and with its slotted, fork-shaped end engages around the transverse pins of the foot step 117 of the shaft 109. Mounted coaxially with the article 110 is the heating device 118 and the spraying sleeve 119 for cooling the work-piece.

The arrangement operates as follows: At the start of the operation the article 110 to be fashioned is fixed on the shaft 109, whereupon with the aid of the lever 116 it is moved into the middle of the heating device 118. The pressure applying devices 115 are without pressure, the racks 111 are loosely opened and the article can pass freely between them. Thereupon, the crank disc 105 is put in rotation and the heating device is put in circuit, so that the article 110 becomes sufficiently heated at its surface. By means of the lever 116 it is then moved to its position between the racks 111 and the pistons of the pressure applying device 115 are placed under pressure. The alternately ascending and descending racks 111 are at the same time forced with their teeth gradually deeper and deeper into the softened surface material of the initially quite smooth article, the toothing or some other profile formation being thus produced. The travel of the pressure applying device is regulated by suitable stops.

When the surface treatment has been completed, the pressure applying device is put out of operation, so that the racks can be moved apart. By means of the lever 116 the fashioned article 110 is again moved into the heating device, where it remains only long enough for the heating to reach the depth required for the surface hardening. It is then rapidly moved by the lever 116 into the sleeve 119 and hardened by the spraying sleeve 119.

In those cases, in which it is of importance for the article to be protected during its treatment against oxidising and other injurious atmospheric influences, a further modification of the arrangement according to the invention is used, such as that shown in Figure 4.

The device, in which the surface of the article has been softened by the aforesaid heating and transformed, after which it is forced through a ring gauge, is housed in a gas-tight casing 200, into which a neutral gas, such as nitrogen or the like, is introduced through the branch 201, escaping at the other end through the branch 202. The ring gauge 203 is fixed in the casing 200, so that the article 204 can be forced through by means of any suitable pressure applying bar or the like, such as a screw spindle 205, passing through the heating device 206 mounted below the gauge, for instance a coil heated with high frequency current or the like, and being heated to the required extent. At the opposite end the article is held by the centre 207 in the central position and thereby guided.

This traversing device has the great advantage, that the article which has become softened only in the surface layer remains cold internally and therefore completely firm, so that for forcing it through a far greater force can be used than when the mass of the article is heated right through, as there can be no deformation of the rigid core, so that the production of profiles becomes possible, which could not hitherto be carried out by the drawing process. The formation of scale is almost completely avoided.

The method according to the invention makes it possible to produce in a novel way articles which could hitherto not be made by superficial heat treatment, such as gear wheels, sprocket wheels, grooved shafts, fluted rolls, various bar profiles and so forth, or it becomes possible to use simpler and cheaper tools. The article which has been heated at the surface only will cool down rapidly, as a vigorous equalisation of temperature takes place between the surface and the interior. At the same time, the tools used are in general less severely taxed by the heat. Moreover, the mechanical properties of the material are greatly improved, owing to the circumstance that the run of the fibres is nowhere seriously disturbed, the strength being, on the contrary, greatly increased through the consolidation of the material, due to its being forced in.

Through the employment of the method according to the invention the possibility is obviously presented, not only to operate on metals, but on various thermoplastic materials, such as artificial substances.

I claim:

1. Means for fashioning articles from metals or thermoplastic materials, comprising: means for rapidly heating the surface of the article, a tool for changing the shape of the article, a carrier for firmly gripping the article and moving it first to the heating means and then to the tool, and means for holding the tool in a fixed operative relation to the article, moving it along the article, and at the same time pressing it against the article.

2. Means for fashioning articles from metals or thermoplastic materials, comprising: means for rapidly heating the surface of the article, a tool for changing the shape of the article, a carrier, such as a chuck, for firmly gripping the article and moving it first to the heating means and then to the tool, means for holding the tool in a fixed operative relation to the article, moving it along the article, and at the same time pressing it against the article, a peripherally perforated tube extending into the interior of the article to be shaped as far as a point in the neighbourhood of the surface to be heated, and means for supplying cooling fluid to the said tube.

3. Means for fashioning articles from metals or thermoplastic materials, comprising: means for rapidly heating the surface of the article, by the use of high-frequency electro-magnetic energy, a tool for changing the shape of the article, a carrier, such as a chuck, for firmly gripping the article and moving it first to the heating means and then to the tool, and means for holding the tool in a fixed operative relation to the article, moving it along the article, and at the same time pressing it against the article.

4. Means for fashioning articles from metals or thermoplastic materials, comprising: an electrical conductor of suitable form, for instance a coil, means for supplying high-frequency current to the conductor for rapidly heating the surface of the article, a tool for changing the shape of the article, a carrier, such as a chuck, for firmly gripping the article and moving it first to the heating means and then to the tool, and means for holding the tool in a fixed operative relation to the article, moving it along the article, and at the same time pressing it against the article.

5. Means for fashioning articles from metals or thermoplastic materials, comprising: means for rapidly heating the surface of the article, toothed members such as toothed wheels and racks for forming teeth in the surface of the article, a carrier, such as a chuck, for firmly gripping the article and moving it first to the heating means and then to the toothed member, and means for holding the toothed member in a fixed operative relation to the article, moving it along the article, and at the same time pressing it against the article.

6. Means for fashioning articles from metals or thermoplastic materials, comprising: means for rapidly heating the surface of the article, a tool for changing the shape of the article, a carrier, such as a chuck, for firmly gripping the article and moving it first to the heating means and then to the tool, means for holding the tool in a fixed operative relation to the article, moving it along the article, and at the same time pressing it against the article, a gas-tight casing entirely surrounding the said fashioning means, and means for supplying an inert atmosphere to the said casing.

7. A method of fashioning gears from metals or thermoplastic materials, comprising a rapid heating of the surface layers to be fashioned into the teeth under use of induced high frequency currents without heating and softening the inner core of the work piece and then subjecting the surface layers, thus softened, to the deformation treatment by a toothed tool fashioning the teeth of the gear produced by a relative rolling motion of the workpiece and the tool, the motions of the workpiece and the tool being made dependent one on another at least during a part of the fashioning process.

8. A method of fashioning gears from metals or thermoplastic materials, comprising a rapid heating of the surface layers to be fashioned into the teeth under use of induced high frequency currents without heating and softening the inner core of the workpiece and then subjecting the surface layers, thus softened, to the deformation treatment by toothed tools fashioning the teeth of the gear produced by a relative rolling motion of the workpiece and the tools, the motions of the workpiece and the tools being made dependent one on another at least during a part of the fashioning process.

9. A method of fashioning gears from metals or thermoplastic materials, comprising a rapid heating of the surface layers to be fashioned into the teeth under use of induced high frequency currents without heating and softening the inner core of the workpiece and then subjecting the surface layers, thus softened, to the deformation treatment by a toothed tool fashioning the teeth of the gear produced by a relative rolling motion of the workpiece and the tool, the motions of the workpiece and the tool being made dependent one on another at least during a part of the fashioning process, and the teeth of the tool being gradually forced into the softened surface layers of the workpiece by moving the tool radially to the axis of the workpiece during the fashioning treatment.

10. A method of fashioning gears from metals or thermoplastic materials, comprising a rapid heating of the surface layers to be fashioned into the teeth under use of induced high frequency currents without heating and softening the inner core of the workpiece and then subjecting the surface layers, thus softened, to the deformation treatment by toothed tools fashioning the teeth of the gear produced by a relative rolling motion of the workpiece and the tools, the motions of the workpiece and the tools being made dependent one on another at least during a part of the fashioning process, and the teeth of the tools being gradually forced into the softened surface layers of the workpiece by moving the tools radially to the axis of the workpiece during the fashioning treatment.

11. A method of fashioning gears from metals or thermoplastic materials, comprising a rapid heating of the surface layers, to be fashioned into the teeth under use of induced high frequency currents without heating and softening the inner core of the workpiece and then subjecting the surface layers, thus softened, to the deformation treatment by a toothed tool fashioning the teeth of the gear produced by a relative rolling motion of the workpiece and the tool, the motions of the workpiece and the tool being made dependent one on another at least during a part of the fashioning process and the teeth of the tool being gradually forced into the softened surface layers of the workpiece by moving the tool radially to the axis of the workpiece during the fashioning treatment, the excess material being forced to appear on the surfaces of the gear such as tips of the teeth and end walls of the teeth, where it can be worked off.

12. Means for fashioning articles from metals or thermoplastic materials, comprising means for rapidly heating the surface of the article, toothed members such as toothed wheels and racks for forming teeth in the surface of the article, a carrier, such as a chuck, for firmly gripping the article and moving it first to the heating means and then to the toothed member, and means for holding the toothed member in a fixed operative relation to the article, moving it against the article, the toothed members being constructed with free spaces for the excess material forced away during the fashioning at such places, so that all excess material appears on the surfaces of the gear such as tips of the teeth and end walls of the teeth, where it can be worked off.

JIŘÍ STIVÍN.

REFERENCES CITED

The following references are of record in the file of this patent:

UNITED STATES PATENTS

| Number | Name | Date |
|---|---|---|
| 501,547 | Thomson | July 18, 1893 |
| 1,187,275 | Derihon | June 13, 1916 |
| 1,558,086 | Gustavsen | Oct. 20, 1925 |
| 1,568,648 | White | Jan. 5, 1926 |
| 1,578,019 | Ellis et al. | Mar. 23, 1926 |
| 1,701,889 | Junker | Feb. 12, 1929 |
| 1,872,067 | Furrer | Aug. 16, 1932 |
| 1,968,442 | Clark et al. | July 31, 1934 |
| 2,182,922 | Heschel | Dec. 12, 1939 |

FOREIGN PATENTS

| Number | Country | Date |
|---|---|---|
| 53,224 | Germany | Aug. 20, 1890 |